Oct. 9, 1923.

L. RELLSTAB 1,470,389

RADIO PILOT CABLE SYSTEM

Filed Aug. 23, 1921

Inventor:
Ludwig Rellstab
by Knight Bros.
Attys

Patented Oct. 9, 1923.

1,470,389

UNITED STATES PATENT OFFICE.

LUDWIG RELLSTAB, OF ZEIST, NETHERLANDS, ASSIGNOR TO SIEMENS & HALSKE, AKTIENGESELLSCHAFT, OF SIEMENSSTADT, NEAR BERLIN, GERMANY, A GERMAN CORPORATION.

RADIO PILOT-CABLE SYSTEM.

Application filed August 23, 1921. Serial No. 494,726.

*To all whom it may concern:*

Be it known that I, LUDWIG RELLSTAB, residing at Zeist, Netherlands, have invented certain new and useful Improvements in Radio Pilot-Cable Systems (for which I have filed application in Germany 17 Dec. 1918, Ser. No. S.49359 XI/65a; Holland, Feb. 26, 1920, Ser. No. 14152; Norway, March 2, 1920, Ser. No. 19505; Sweden, Feb. 17, 1920, Ser. No. 745/20; Great Britain, July 6, 1920, Ser. No. 18858/20), of which the following is a specification.

My invention relates to the marking of special road marks in a pilot cable system in which use is made of conductors traversed by an alternating or noncontinuous current, the currents flowing through said conductors to act inductively upon apparatuses set up on board a ship. In many cases it may be found expedient in such fairways to provide special road marks arranged along the track to be steered by the vessel for the purpose of showing various points of the fairway, which may be dangerous. Also the road marks may be arranged at equal distances from one another, for instance, of 15 to 20 naut. miles, so that the speed of the ship may be determined by the length of the distances travelled. If it is desired to use the road marks of the fairway conductor to indicate the distance of the ship from the starting point, one may, for instance, proceed in such a way that the first indicating means are arranged at a distance of 20 naut. miles from the starting point, the second road mark at a further distance of 40 naut. miles, the third one at a further distance of 60 miles, and so on in always varying proportion. When the ship has traversed the distance between any two indicating points, it will be possible on the ship to determine her distance from the starting point after the length of this distance has been determined and, to find her speed in regard of the time used to pass the distance between any two road marks.

In order to attain this object according to the present invention, the pilot cable which is laid in the fairway is provided at predetermined points with devices like submarine sound-transmitters which by further conducting the signalling current in the conductor act automatically upon special receiving devices provided on board the ship. By these means it is possible to determine at any time that the ship is passing a particular point of the fairway.

Figure 1:
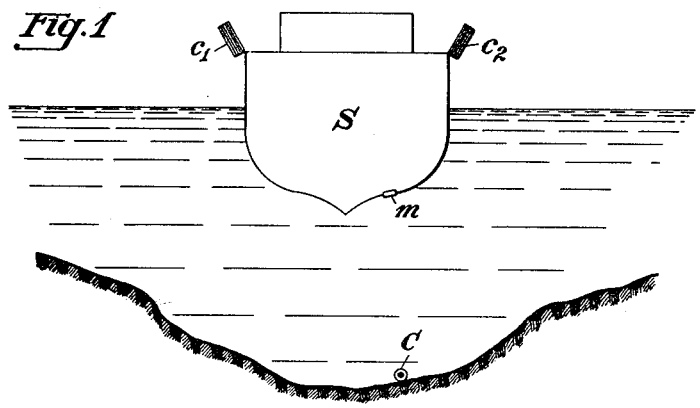
Figure 2:
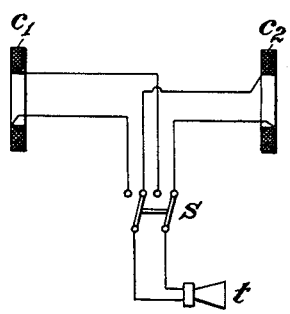
Figure 4:
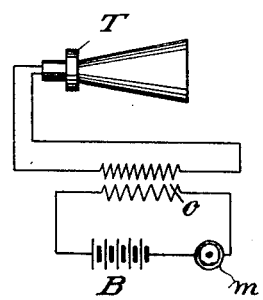
Figure 3:
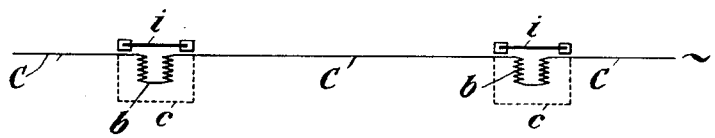

In the drawings affixed to this specification and forming part thereof, my invention is illustrated in a purely diagrammatic manner by way of example, Figure 1 representing diagrammatically a ship's fairway showing the location of a vessel with relation to the pilot cable;

Figure 2 representing a circuit diagram of the pilot coils located on the vessel;

Figure 3 representing diagrammatically a pilot cable portion into which special marking devices are inserted according to my invention; and Figure 4 representing a circuit diagram of the special receiver located on the vessel for the signals from the fairway marks.

The manner in which a pilot cable is arranged in a ship's fairway so that a vessel may be piloted thereby through the observation of the inductive effect of the cable current upon the coils disposed laterally of the vessel, is shown in Figure 1 in a conventional manner. The general idea underlying this method of piloting is old in the art and is for instance illustrated in the U. S. Patent No. 736,432 to Owens.

In Figure 1, C represents the pilot cable, S represents the vessel to be piloted, said vessel carrying coils $c_1$, $c_2$ one disposed on each side of the vessel in such relation to the magnetic lines of force surrounding the cable that due to the inductive effect upon these coils produced by these lines of force suitable indications are observable on the vessel. These coils $c_1$, $c_2$ may for instance be arranged in a circuit such as is shown in Figure 2 in which a change-over switch $s$ is provided which is adapted to alternately connect one or the other of the two coils to a common telephone receiver $t$. Also this arrangement is old in the art and is presumed in the present case to exist in one or another form on the vessel.

In order to obtain in addition to the indications produced by coils $c_1$ and $c_2$ and according to which the vessel may be piloted, such signals as will mark certain definite points along the fairway, I provide according to my invention along the pilot cable C sounding devices which preferably consist each of coils $b$ through which the cable current passes and which are capable of electrically operating a diaphragm $i$ such that the latter will issue submarine sound signals which depend upon the character of the alternating current used in the cable. Submarine sound transmitters are well known in the art and I do not wish to limit my invention to any particular type, but I have illustrated these transmitters only diagrammatically by the coils $b$ and the diaphragm $i$. These transmitters may be enclosed in waterproof boxes as indicated in dotted lines at $c$ in Figure 3. Such submarine sound transmitters are applied at suitable points along the fairway for warning the vessel of danger, or for indicating the points where the vessel's course should be changed, or for any other purpose, and the ship's pilot is made aware of the location of these sound transmitters when the vessel passes over them by means of a separate submarine sound receiver placed in the conventional manner on the vessel below the surface of the water. This arrangement is diagrammatically indicated in Figure 1 at $m$ and the receiving arrangement in a general way is indicated in Figure 4. I particularly note that this arrangement in itself does not form any part of my invention, but is merely illustrated so as to clearly convey to the reader the manner in which I intend to convey the signals issued from the submarine sound transmitters to the pilot. Referring to Figure 4 $m$ may represent for instance a microphone arranged as shown in Figure 1 which is in circuit with a source of direct current B and which may be in circuit with the primary of a telephone transformer $o$, the secondary of which is located in circuit with a telephone T which may be placed for instance on the bridge together with the telephone $t$ actuated by coil $c_1$, $c_2$. While for instance the sound frequency observed in telephone T may be the same as that observed in telephone $t$ on account of the submarine sound device $b$ being operated by the same current in the cable which causes the indications in the telephone $t$, yet the points at which the submarine sound transmitters are located in the cable can be clearly observed and noted, because telephone T will operate only at its maximum intensity when the vessel is directly over the transmitter.

Having now particularly described and ascertained the nature of my said invention and in what manner the same is to be performed, I declare what I claim is:—

A pilot cable system for vessels having a cable located at the bottom of the fairway and carrying a non-continuous current, and including receiving loops located on the vessel for determining the position of the vessel laterally of the cable, in combination with submarine sound transmitters suitably distributed over the length of the cable and actuated by the cable current for indicating desired points along the path of the vessel, and means on the vessel independent of said loops for receiving the signals from said sound transmitters.

In testimony whereof I affix my signature.

LUDWIG RELLSTAB.

Witnesses:
H. Y. KNIJPERS,
H. O. LANGENDYK.